US 7,382,703 B2

(12) United States Patent
Nakase et al.

(10) Patent No.: US 7,382,703 B2
(45) Date of Patent: Jun. 3, 2008

(54) OPTICAL DISC APPARATUS

(75) Inventors: Hiromi Nakase, Osaka (JP); Hiroyuki Matsuda, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 133 days.

(21) Appl. No.: 10/538,182

(22) PCT Filed: Dec. 11, 2003

(86) PCT No.: PCT/JP03/15924

§ 371 (c)(1),
(2), (4) Date: Jun. 9, 2005

(87) PCT Pub. No.: WO2004/055815

PCT Pub. Date: Jul. 1, 2004

(65) Prior Publication Data

US 2006/0018225 A1    Jan. 26, 2006

(30) Foreign Application Priority Data

Dec. 13, 2002  (JP)  ............................. 2002-362533

(51) Int. Cl.
   *G11B 7/005*  (2006.01)
(52) U.S. Cl. ................... 369/47.55; 369/30.01
(58) Field of Classification Search ............ None
   See application file for complete search history.

(56) References Cited

U.S. PATENT DOCUMENTS

| 4,527,265 A * | 7/1985 | d'Alayer de Costemore d'Arc ..................... 720/673 |
| 4,916,685 A * | 4/1990 | Endoh et al. ............. 369/53.29 |
| 5,617,383 A * | 4/1997 | Matsumoto et al. ...... 369/30.04 |
| 6,570,837 B1 * | 5/2003 | Kikuchi et al. .......... 369/275.1 |
| 6,928,039 B2 * | 8/2005 | Millikan et al. ......... 369/47.33 |

(Continued)

FOREIGN PATENT DOCUMENTS

JP    3-69042    3/1991

(Continued)

OTHER PUBLICATIONS

Machine translation of JP 2002-074920 (Ishigaki et al.) provided by the Japanese Patent Office.*

(Continued)

*Primary Examiner*—Andrea Wellington
*Assistant Examiner*—Michael V Battaglia
(74) *Attorney, Agent, or Firm*—RatnerPrestia (57) ABSTRACT

In the optical disc apparatus according to the present invention, the CPU 113 is operated to execute a control program stored in the ROM 112 to calculate a reproduction time at the time point when the power supply was turned off based on parameters after reading out from the DRAM 111 the parameters at the time point when the power supply was turned off. The CPU 113 is then operated to execute the control program stored in the ROM 112 to produce a control signal to have a display unit, not shown, display the reproduction time thus calculated, and calculate a reproduction position at the time point when the power supply was turned off based on parameters indicative of the address number and produce a control signal to have the reproduction of the reproduction information such as, for example, audio data and image data resumed.

4 Claims, 7 Drawing Sheets

U.S. PATENT DOCUMENTS 7,016,268 B2 * 3/2006 Yoshida et al. .......... 369/30.24
7,050,376 B2 * 5/2006 Han et al. .................. 369/53.2
7,110,755 B2 * 9/2006 Shibasaki et al. .......... 455/420

FOREIGN PATENT DOCUMENTS

JP   10-241344   9/1998
JP   2002-74920   3/2002

OTHER PUBLICATIONS

International Search Report corresponding to application No. PCT/JP03/15924 dated Jan. 27, 2004.

* cited by examiner

OPTICAL DISC APPARATUS

THIS APPLICATION IS A U.S. NATIONAL PHASE APPLICATION OF PCT INTERNATIONAL APPLICATION PCT/JP2003/015924.

TECHNICAL FIELD OF THE INVENTION

The present invention relates to an optical disc apparatus for resuming reproduction of information recorded on an optical disc, and more particularly to an optical disc apparatus for obtaining reproduction time information to resume reproduction of compression audio information recorded on an optical disc based on the reproduction time information in the event that power supply is turned off and then turned on while reproducing the compressed audio information recorded on the optical disc even though the address information of the compressed audio information has no reproduction time information.

DESCRIPTION OF THE RELATED ART

Up until now, there have been proposed a wide variety of optical disc apparatuses for reproducing information recorded on an optical disc. One typical example of the conventionally known optical disc apparatus is disclosed in, for example, Japanese Patent Laid-Open Publication No. 2002-230781 (see columns 0005 and 0006). The conventional optical disc apparatus herein disclosed comprises a storage unit for storing address information indicative of a reproduction position of an optical disc while reproducing data such as, for example, music data, image data, or the like, hereinafter simply referred to as "data", recorded on an optical disc, and is designed to start reproduction of data recorded on the optical disc from the reproduction position immediately prior to the time point when power supply was turned off based on the address information stored in the storage unit after the conventional optical disc apparatus is rebooted in the event that the power supply is turned off and then turned on while reproducing the data recorded on the optical disc. The operation of starting reproduction of data recorded on the optical disc from the reproduction point immediately prior to the time point when the power supply was turned off will be hereinafter simply referred to as the operation of "resuming reproduction". The conventional optical disc apparatus as previously mentioned is frequently used as an in-vehicle apparatus to be provided in an automotive vehicle and adapted to have a battery supply power to the storage unit to have the information remained intact in the storage unit in the event that accessory power supply (ACC power supply) is turned off.

Compressed audio data represented by, for example, MP3 (MPEG-1 Audio Layer-3) emerged in recent years, may not include information on a reproduction time, hereinlater simply referred to as "reproduction time information", in its address information of the optical disc. As described in the above, the conventional optical disc apparatus as previously mentioned, however, is simply designed to start reproduction of data recorded on the optical disc from the reproduction position immediately prior to the time point when power supply was turned off based on the address information stored in the storage unit after the conventional optical disc apparatus is rebooted in the event that the power supply is turned off and then turned on while reproducing the data recorded on the optical disc, resulting from the fact that the conventional optical disc apparatus can not extract the reproduction time information from the address information immediately prior to the time point when power supply was turned off. This leads to the fact that the conventional optical disc apparatus encounters a drawback in that the conventional optical disc apparatus tends to obtain no reproduction time information and thus start reproduction of data recorded on the optical disc from the beginning.

The present invention is made for the purpose of overcoming the above mentioned drawback, and it is therefore an object of the present invention to provide an optical disc apparatus which can obtain the reproduction time information after the power supply is restored even in the case that the power supply is turned off while reproducing compression audio signal recorded on the optical disc having no reproduction time information in its address information.

DISCLOSURE OF THE INVENTION

In accordance a first aspect of the present invention, there is provided an optical disc apparatus, comprising; an optical unit for projecting a laser light to an optical disc and converting a reflection light reflected from the optical disc into an electrical signal; signal processing means for processing the electrical signal from the optical unit to have the electrical signal converted into reproduction information required for reproduction; parameter storage means for storing therein a parameter contained in the reproduction information from the signal processing means; and reproduction time computing means for computing a reproduction time based on the parameter stored in the parameter storage means. The reproduction information herein used is intended to mean data required for reproduction such as, for example, music data, image data, and the like. The parameter herein used is intended to mean information on address number, bit rate, monaural/stereo and the like.

In accordance with the above construction, the optical disc apparatus according to the present invention can obtain reproduction time information after the power supply is restored even in the case that the power supply is turned off while reproducing compression audio signal recorded on the optical disc having no reproduction time information in its address information, resulting from the fact that the optical disc apparatus is operative to calculate a reproduction time based on the parameter contained in the reproduction information.

In accordance with a second aspect of the present invention, the aforementioned optical disc apparatus may further comprise optical disc reproduction means for determining a reproduction start position based on the parameter stored in the parameter storage means.

In accordance with the above construction, the optical disc apparatus according to the present invention can obtain reproduction time information and resume reproduction of the optical disc after the power supply is restored even in the case that the power supply is turned off while reproducing compression audio signal recorded on the optical disc having no reproduction time information in its address information, resulting from the fact that the optical disc apparatus is operative to determine the reproduction start position based on the parameter contained in the reproduction information stored in the parameter storage means.

In accordance with a third aspect of the present invention, the aforementioned optical disc apparatus may further comprise reproduction time displaying means for displaying the reproduction time based on information on the reproduction time computed by the reproduction time computing means.

In accordance with the above construction, the optical disc apparatus according to the present invention can obtain reproduction time information and display the reproduction time after the power supply is restored even in the case that the power supply is turned off while reproducing compression audio signal recorded on the optical disc having no reproduction time information in its address information, resulting from the fact that the optical disc apparatus is operative to calculate a reproduction time based on the parameter, such as, for example, information on address number, bit rate, and the like, contained in the reproduction information.

In accordance with a fourth aspect of the present invention, the aforementioned optical disc apparatus may be mounted on an automotive vehicle, and in which the reproduction time computing means may be operative to read out the parameter stored in the parameter storage means to calculate a reproduction time at the time point when an accessory power supply was turned off and the optical disc reproduction means may be operative to determine a reproduction start position substantially at the time point when the accessory power supply was turned off in the event that the accessory power supply was turned off while reproducing said optical disc and then turned on.

In accordance with the above construction, the optical disc apparatus according to the present invention can reproduce and stop reproducing information recorded on the optical disc whenever the ignition key is operated and the accessory power supply is turned on and off, and calculate a reproduction time at the time point when the ignition key was turned off and thus the accessory power supply was turned off before resuming reproduction of the information recorded on the optical disc in the case that the accessory power supply is restored. This leads to the fact that the optical disc apparatus according to the present invention thus constructed can obtain the reproduction time information after the accessory power supply is restored and resume reproduction of information even in the case that the accessory power supply is turned off while reproducing compression audio signal recorded on the optical disc having no reproduction time information in its address information.

In accordance with a fifth aspect of the present invention, the aforementioned optical disc apparatus may be operatively connected to an audio equipment operative to selectively assume a plurality of operation modes including an optical disc operation mode having the optical disc reproduced. In the aforementioned optical disc apparatus, the reproduction time computing means may be operative to read out the parameter stored in the parameter storage means to calculate a reproduction time at the time point when the audio equipment switches to an operation mode other than the optical disc operation mode from the optical disc operation mode and the optical disc reproduction means is operative to determine a reproduction start position substantially at the time point when the audio equipment switches to an operation mode other than the optical disc operation mode from the optical disc operation mode in the event that the audio equipment switches to an operation mode other than the optical disc operation mode from the optical disc operation mode while reproducing the optical disc and then switches to the optical disc operation mode.

In accordance with the above construction, the optical disc apparatus according to the present invention thus constructed, mounted on an automotive vehicle, can reproduce and stop reproducing information recorded on the optical disc in response to the operation mode selected by way of the operation panel, and calculate reproduction time information before resuming reproduction of the information recorded on the optical disc. This leads to the fact that the optical disc apparatus according to the present invention thus constructed can obtain the reproduction time information after the operation mode is changed from the optical disc operation mode to the other operation mode and resume reproduction of the optical disc from the reproduction position immediately prior to the time point when the optical disc operation mode changed to the other operation mode in the event that the optical disc operation mode changed to the other operation mode and then returned to the optical disc operation mode even while reproducing compression audio signal recorded on the optical disc having no reproduction time information in its address information.

BRIEF DESCRIPTION OF THE DRAWINGS

The features and advantages of an optical disc apparatus according to the present invention will be more clearly understood from the following description taken in conjunction with the accompanying drawings.

DESCRIPTION OF THE PREFERRED EMBODIMENTS

The embodiments of the optical disc apparatus according to the present invention will be described hereinafter with reference to FIGS. 1 to 7 of the drawings.

First Preferred Embodiment

Figure 1:
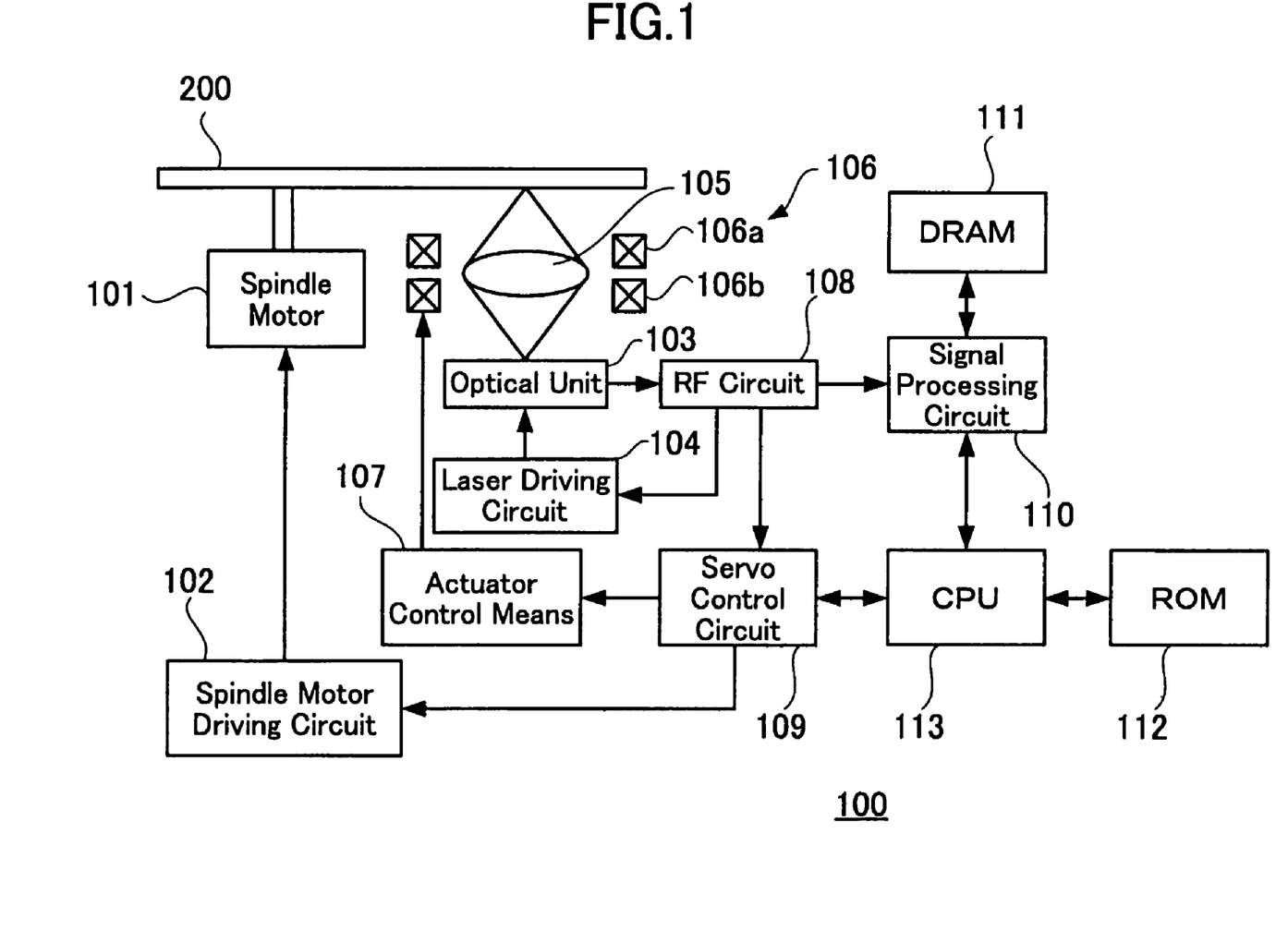
FIG. 1 is a block diagram showing a first embodiment of the optical disc apparatus according to the present invention.

FIG. 1 is a block diagram showing a construction of a first embodiment of the optical disc apparatus according to the present invention. Here, the optical disc apparatus 100 shown in FIG. 1 is intended to mean an apparatus for projecting a laser light to a pit formed on an optical disc 200 and detecting a reflection light reflected from the pit formed on the optical disc 200 to have the reflection light converted to an information signal to be reproduced therethrough. The optical disc 200 may be constituted by, for example, a compact disc (hereinlater simply referred to as "CD"), a digital versatile disc (hereinlater simply referred to as "DVD"), and the like. It is assumed in the description about the present embodiment that the optical disc 200 is constituted by a CD for the purpose of simplicity but it is of course needless to mention that the optical disc 200 may be constituted by any other storage medium.

As shown in FIG. 1, the optical disc apparatus 100 shown as an optical disc apparatus according to the present invention comprises a spindle motor 101 for driving the optical disc 200 to have the optical disc 200 rotated, a spindle motor driving circuit 102 for controlling the spindle motor 101 to have the spindle motor 101 rotated at a predetermined number of rotations per second, and an optical unit 103 including a semiconductor laser source, not shown, for projecting a light beam to the optical disc 200 and a photoelectric conversion element, not shown, for receiving a reflection light reflected from the optical disc 200 to have the reflection light converted to an electric signal.

The optical disc apparatus 100 further comprises a laser driving circuit 104 for controlling the optical unit 103 to have the optical unit 103 project the light beam at an arbitrary level, an objective lens 105 intervening between the optical unit 103 and the optical disc 200 to have the reflection light reflected from the optical disc 200 focused on the photoelectric conversion element forming part of the optical unit 103, an actuator unit 106 for actuating the objective lens 105, and actuator control means 107 for controlling the actuator unit 106 to have the actuator unit 106 actuate the objective lens 105 between the optical unit 103 and the optical disc 200. Here, the actuator unit 106 is constituted by a focus actuator 106a for actuating the objective lens 105 to have an optical spot of the objective lens 105 moved along a focus direction parallel to an optical axis of the objective lens 105 and a tracking actuator 106b for actuating the objective lens 105 to have the optical spot of the objective lens 105 moved along a radial direction of a track of the optical disc 200.

The optical disc apparatus 100 further comprises an RF (radio frequency) circuit 108 for producing an RF signal and an error signal such as, for example, a focus error signal, a tracking error signal, and the like, based on the electrical signal from the optical unit 103, a servo control circuit 109 for driving the spindle motor driving circuit 102 and the actuator control means 107 to have the spindle motor driving circuit 102 and the actuator control means 107 respectively controlled based on the error signal from the RF circuit 108, and a signal processing circuit 110 for converting the RF signal from the RF circuit 108 into reproduction information such as, for example, sound information, image information and the like. Here, the signal processing circuit 110 functions as signal processing means according to the present invention.

The optical disc apparatus 100 further comprises a DRAM (dynamic random access memory) 111 for storing therein reproduction Information and the like, a ROM (read only memory) 112 for storing therein a control program executable to control the whole operation of the optical disc apparatus 100 and a central processing unit, hereinlater simply referred to as "CPU " 113, for executing the control program stored in the ROM 112. Here, the DRAM 111 functions as parameter storage means according to the present invention, the ROM 112 and the CPU 113 collectively function as reproduction time computing means and optical disc reproduction means according to the present invention to compute a reproduction time based on parameters stored in the DRAM 111 and determine a reproduction start position based on the parameters stored in the DRAM 111 after the optical disc apparatus 100 is rebooted. The parameters stored in the DRAM 111 include, for example, but not limited to, information on address number, bit rate, monaural/stereo and the like. Here, it is assumed that the optical disc apparatus 100 is electrically connected with an automobile battery, a household power supply, an internal power supply such as, for example, an internal battery, or the like to have power uninterruptedly supplied at, not less than, a minimum level to the DRAM 111, the ROM 112, the CPU 113, and the like, which constitute essential constituent elements to carry out a function of resuming reproduction, while the optical disc apparatus 100 assumes an operation stop state in which a main power supply to the optical disc apparatus 100 is turned off. While it has been described in the above that the parameter storage means is constituted by the DRAM 111 by way of example, it is needless to mention that the parameter storage means may be constituted by any other storage medium such as, for example, a SRAM (static random access memory), a flash memory, an FRAM (ferroelectric RAM), or the like. The flash memory may include an EEPROM (electrically erasable programmable ROM). It is preferable that the parameter storage means is constituted by a flash memory or an FRAM because of the fact that the parameter, the reproduction information, or the like remains undeleted from the parameter storage means regardless of whether or not the optical disc apparatus 100 assumes the operation stop state in which the main power supply to the optical disc apparatus 100 is turned off.

Figure 2:
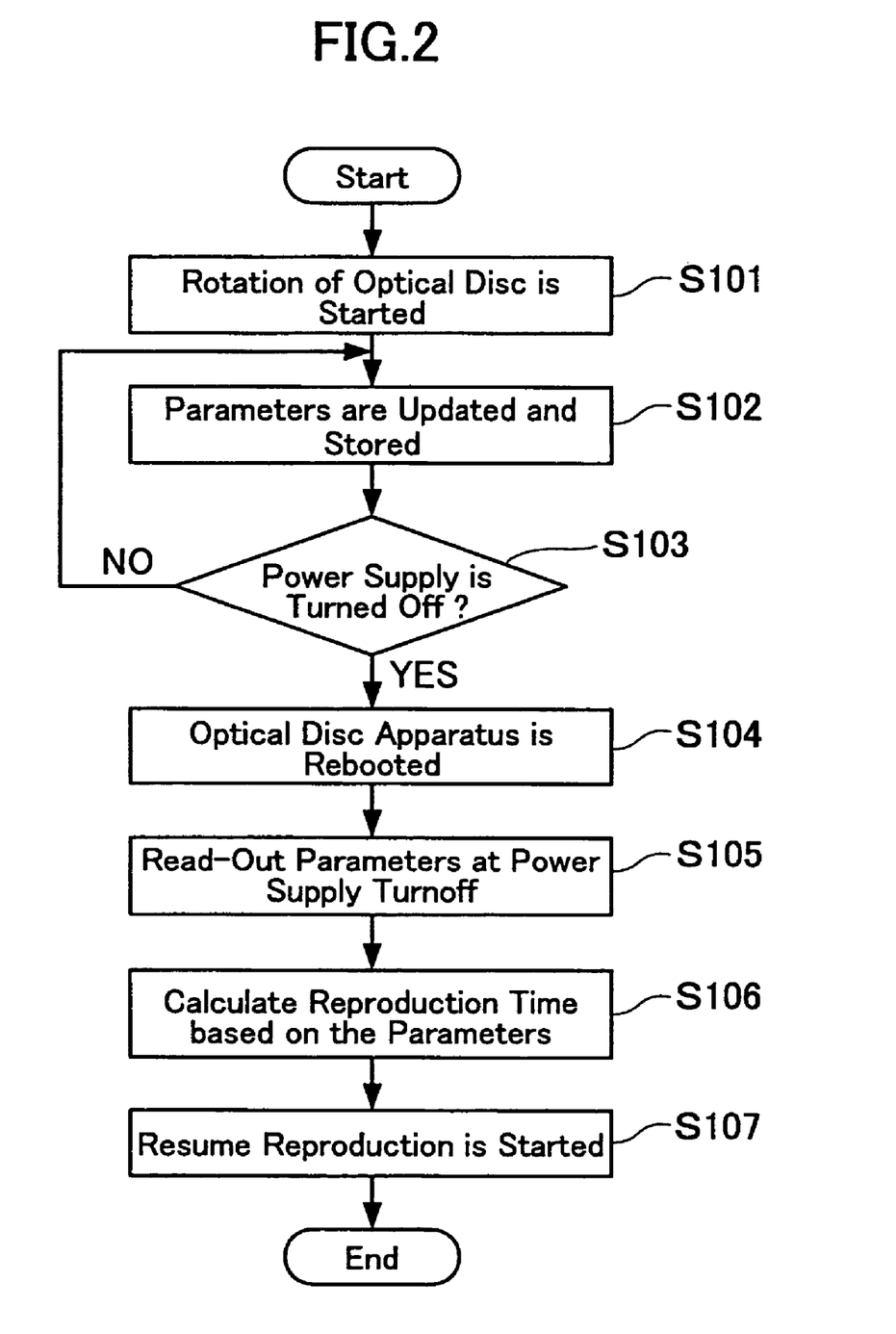
FIG. 2 is a flow chart showing an operation of resuming reproduction performed by the optical disc apparatus shown in FIG. 1.

The, the operation of resuming reproduction performed by the present embodiment of the optical disc apparatus 100 according to the present invention will be described hereinlater with reference to a flow chart shown in FIG. 2.

In step S101, the CPU 113 is operated to execute the control program stored in the ROM 112 to control the optical disc 200 to have the optical disc 200 rotated. At this time, a reflection light reflected from the optical disc 200 is converted by the optical unit 103 into an electric signal. The electric signal is then converted into reproduction information by the RF circuit 108 and the signal processing circuit 110.

Step S101 goes forward to step S102, in which the CPU 113 is operated to execute the control program stored in the ROM 112 to store parameters contained in the reproduction information in the DRAM 111. In addition, the CPU 113 is operated to execute the control program stored in the ROM 112 to update the parameters stored in the DRAM 111 whenever the parameters contained in the reproduction information have changed.

Step S102 goes forward to step S103, in which it is judged whether or not a power supply, not shown, to the optical disc apparatus 100 is turned off. When it is judged that a power supply is not turned off, step S103 goes back to step S102. This means that the process in step S102 is repeated until the power supply to the optical disc apparatus 100 is failed or turned off. When, on the other hand, it is judged that the power supply is turned off, step S103 goes forward to step S104, in which the optical disc apparatus 100 is turned on and rebooted.

Step S104 goes forward to step S105, in which the CPU 113 is operated to execute the control program stored in the ROM 112 to read out parameters stored in the DRAM 111 at the time point when the power supply was turned off.

Step S105 goes forward to step S106, in which the CPU 113 is operated to execute the control program stored in the ROM 112 to calculate a reproduction time at the time point when the power supply was turned off based on the parameters thus read from the DRAM 111 in accordance with an expression shown as bellows.

Monaural sound:

Reproduction Time (sec.)={(the number of Addresses $x$ number of kb/address)/(Bit Rate (kbp/sec.))}/      1

Stereo sound:

Reproduction Time (sec.)={(the number of Addresses $x$ number of kb/address)/(Bit Rate (kbp/sec.))}/      2

The first expression is used for the optical disc of the monaural recording format, while the second expression is used for the optical disc of the stereo recording format. The CPU 113 is operated to execute the control program stored in the ROM 112 to produce a control signal to have a display unit, not shown, display the reproduction time thus calculated.

Step S106 goes forward to step S107, in which the CPU 113 is operated to execute the control program stored in the ROM 112 to calculate a reproduction position at the time point when the power supply was turned off based on the parameters, such as, for example, parameters indicative of the address number, stored in the DRAM 111 and produce a control signal to have the reproduction of the reproduction information such as, for example, audio data and image data resumed.

As will be seen from the foregoing description, it is to be understood that the present embodiment of the optical disc apparatus 100 can obtain the reproduction time information after the power supply is restored even in the case that the power supply is turned off while reproducing compression audio signal recorded on the optical disc having no reproduction time information in its address information, resulting from the fact that the present embodiment of the optical disc apparatus 100 is operative to calculate the reproduction time based on the address number, the bit rate, and the like, contained in the reproduction information.

Second Preferred Embodiment

Figure 3:
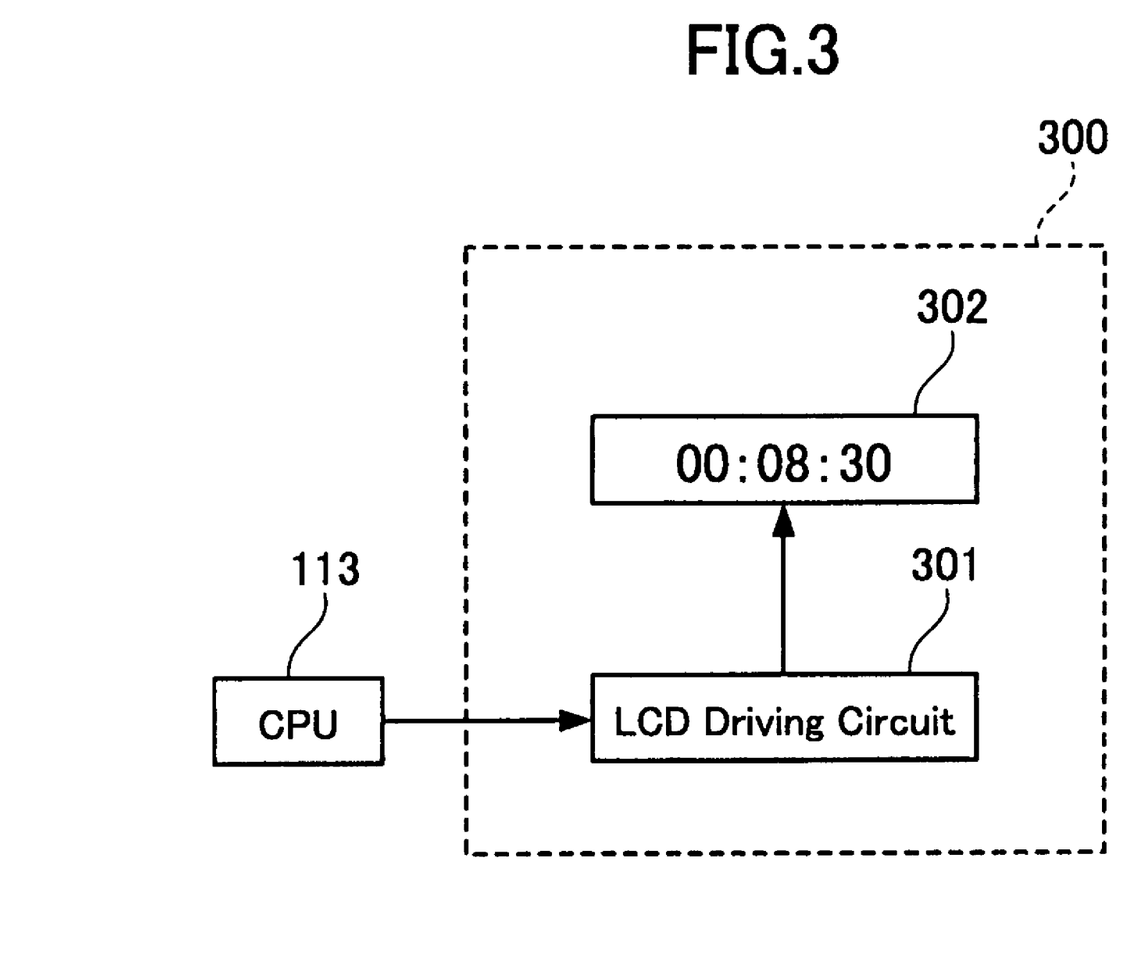
FIG. 3 is a block diagram showing constituent elements forming part of a second embodiment of the optical disc apparatus according to the present invention.

FIG. 3 is a block diagram showing a construction of constituent elements forming part of a second embodiment of the optical disc apparatus according to the present invention. The present embodiment of the optical disc apparatus is shown in FIG. 3 as comprising the first embodiment of the optical disc apparatus 100, not shown, and a reproduction time displaying circuit 300. The reproduction time displaying circuit 300 includes a liquid crystal display 302 and LCD (liquid crystal display) driving circuit 301 for driving the liquid crystal display 302.

As shown in FIG. 3, the first embodiment of the optical disc apparatus 100 is operatively connected to the reproduction time displaying circuit 300 to ensure that the LCD driving circuit 301 is operative to receive information from the CPU 113. This leads to the fact that the reproduction time information calculated by the CPU 113 is outputted to the LCD driving circuit 301. The LCD driving circuit 301 is operative to drive the liquid crystal display 302 to have the liquid crystal display 302 display the reproduction time based on the reproduction time information thus inputted from the CPU 113.

As will be seen from the foregoing description, it is to be understood that the present embodiment of the optical disc apparatus can obtain the reproduction time information as well as have the reproduction time displaying means (reproduction time displaying circuit) display the reproduction time after the power supply is restored even in the case that the power supply is turned off while reproducing compression audio signal recorded on the optical disc having no reproduction time information in its address information, resulting from the fact that the present embodiment of the optical disc apparatus is operative to calculate the reproduction time based on the address number, the bit rate, and the like, contained in the reproduction information.

Third Preferred Embodiment

Figure 4:
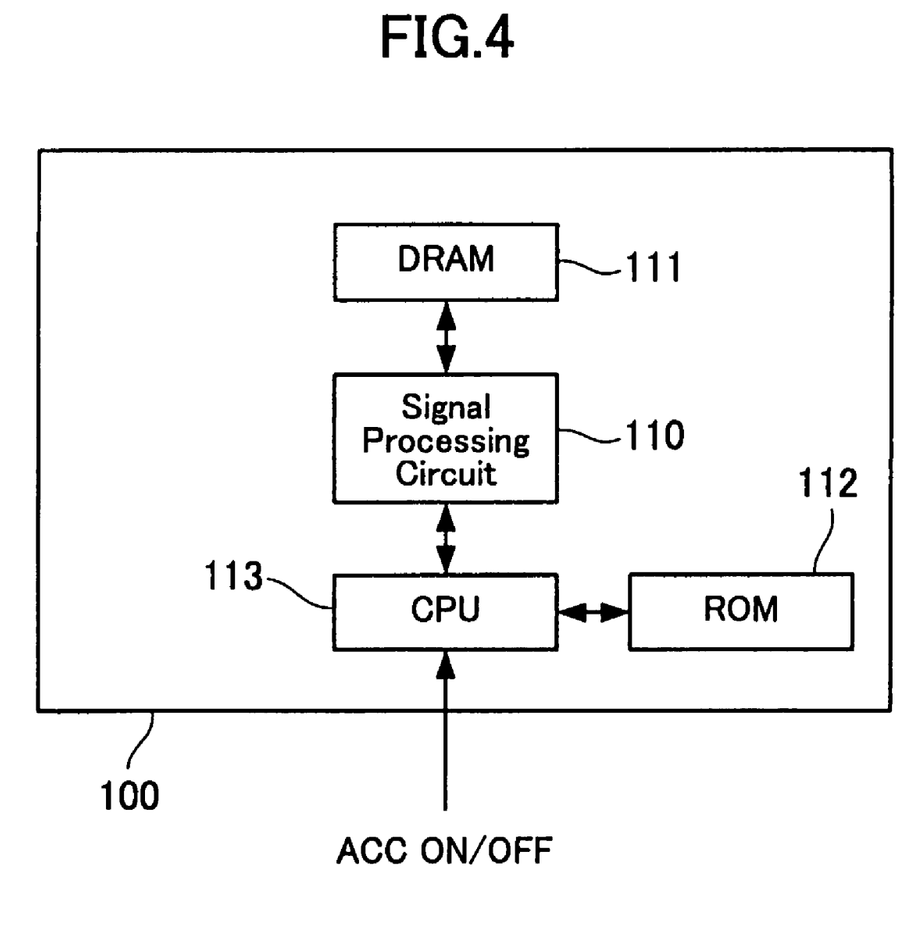
FIG. 4 is a block diagram showing constituent elements forming part of a third embodiment of the optical disc apparatus according to the present invention.
Figure 5:
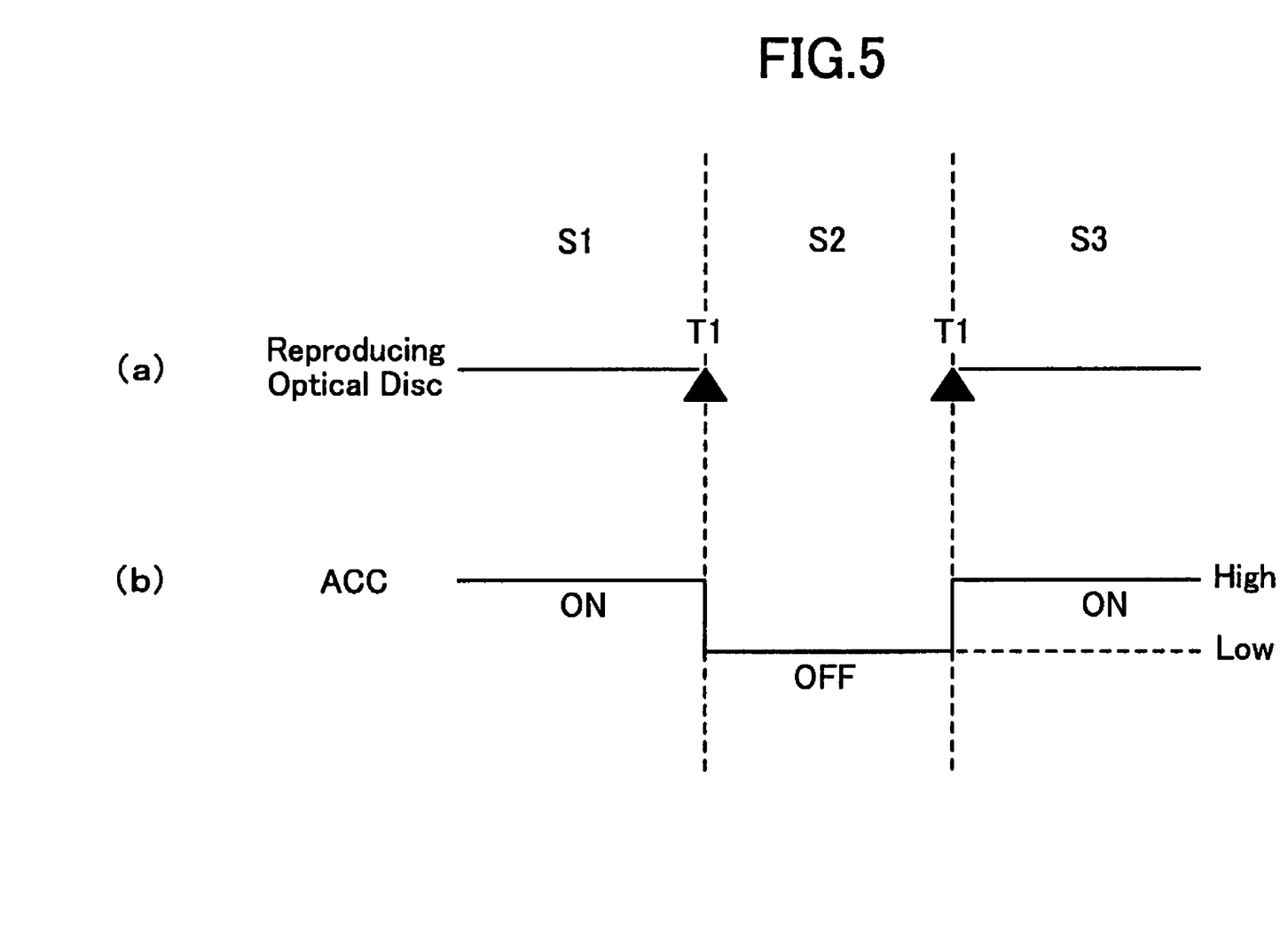
FIG. 5 is a timing chart for explaining an operation of the optical disc apparatus shown in FIG. 4.

FIG. 4 is a block diagram showing a construction of constituent elements forming part of a third embodiment of the optical disc apparatus according to the present invention. The present embodiment of the optical disc apparatus is mounted on an automotive vehicle, and comprising the first embodiment of the optical disc apparatus 100. As shown in FIG. 4, in the present embodiment of the optical disc apparatus according to the present invention, the CPU 113 forming part of the first embodiment of the optical disc apparatus 100 is operative to input an ACC ON/OFF signal indicative that an ignition key of the automotive vehicle is turned on or off. As shown in FIG. 5, the ACC ON/OFF signal designated by "ACC" remains at a high level while power is supplied from an accessory power supply (ACC power supply) and the present embodiment of the optical disc apparatus is capable of reproducing information recorded on the optical disc. The ACC ON/OFF signal, on the other hand, remains at a low level while the accessory power supply is turned off and the present embodiment of the optical disc apparatus is unable to reproduce information recorded on the optical disc.

Here, it is assumed that the control program stored in the ROM 112 includes a control program executable to control the whole operation of the present embodiment of the optical disc apparatus in the case that the ACC ON/OFF signal changes from one of the low and high levels to the other as a result of the operation of the ignition key.

The CPU 113 is designed to input the ACC ON/OFF signal. The CPU 113 operated to carry out the following operation in accordance with the control program stored in the ROM 112.

The CPU 113 is operated to have the optical disc apparatus reproduce the information recorded on the optical disc while the CPU 113 inputs the ACC ON/OFF signal at the high level. The CPU 113, on the other hand, is operated to control the optical disc apparatus to have the optical disc apparatus stop reproducing the information recorded on the optical disc when the CPU 113 inputs the ACC ON/OFF signal at the low level. This means that power fails to be supplied to constituent elements such as the spindle motor 101, the optical unit 103, and the like, other than the CPU 113, the ROM 112, and the DRAM 111 in the case that the accessory power supply is turned off and thus the ACC ON/OFF signal changes from the high level to the low level as a result of the fact that the ignition key is turned off. The operation performed by the present embodiment of the optical disc apparatus when the power supply is turned off is the same as the operation described about the first embodiment.

When power is recovered from the accessory power supply and the ACC ON/OFF signal changes from the low level to the high level as a result of the fact that the ignition key is turned on and power is restored to the constituent elements such as the spindle motor 101, the optical unit 103, and the like, to which power has failed to be supplied since the time point when the reproduction operation of the optical disc was stopped. Simultaneously, the CPU 113 is operated to read out the information stored in the DRAM 111 at the time point when the ACC ON/OFF signal changed from the high level to the low level to calculate reproduction time information, and have the reproduction of the optical disc started from a reproduction position at the time point when the accessory power supply has turned off and the reproduction operation of the optical disc was stopped. Thus, the reproduction operation of the optical disc is resumed.

The operation performed by the present embodiment of the optical disc apparatus when the ignition key is operated will be described with reference to FIG. 5.

As shown in FIG. 5, power is supplied from the accessory power supply in states S1 and S3. In the state S1, information recorded on the optical disc is reproduced and the ACC ON/OFF signal remains at the high level. At a time point when the reproduction time is T1, the ignition key is turned off to have the accessory power supply turned off, and the ACC ON/OFF signal changes from the high level to the low level as will be clearly seen from FIG. 5. This means that the optical disc apparatus changes from the state S1 to the state S2 and the reproduction operation of the optical disc was stopped at the time point when the reproduction time is T1. The state S2 changes to the state S3 when the ignition key is turned on to have the accessory power supply turned on, and the ACC ON/OFF signal changes from the low level to the high level to have the reproduction of the optical disc started from the reproduction time T1 at the time point when the accessory power supply has turned off and the reproduction operation of the optical disc was stopped. The operations performed by the CPU 113 when the state S1 changes to the state S2 and the state S2 changes to the state S3 have been described in the above and thus will not be described.

As will be seen from the foregoing description, it is to be understood that the present embodiment of the optical disc apparatus is operative to reproduce and stop reproducing information recorded on the optical disc whenever the ignition key is operated and the accessory power supply is turned on and off, and calculate a reproduction time at the time point when the ignition key was turned off and thus the accessory power supply was turned off before resuming reproduction of the information recorded on the optical disc. This leads to the fact that the present embodiment of the optical disc apparatus can obtain the reproduction time information after the power supply is restored and resume reproduction of information even in the case that the power supply is turned off while reproducing compression audio signal recorded on the optical disc having no reproduction time information in its address information.

Fourth Preferred Embodiment

Figure 6:
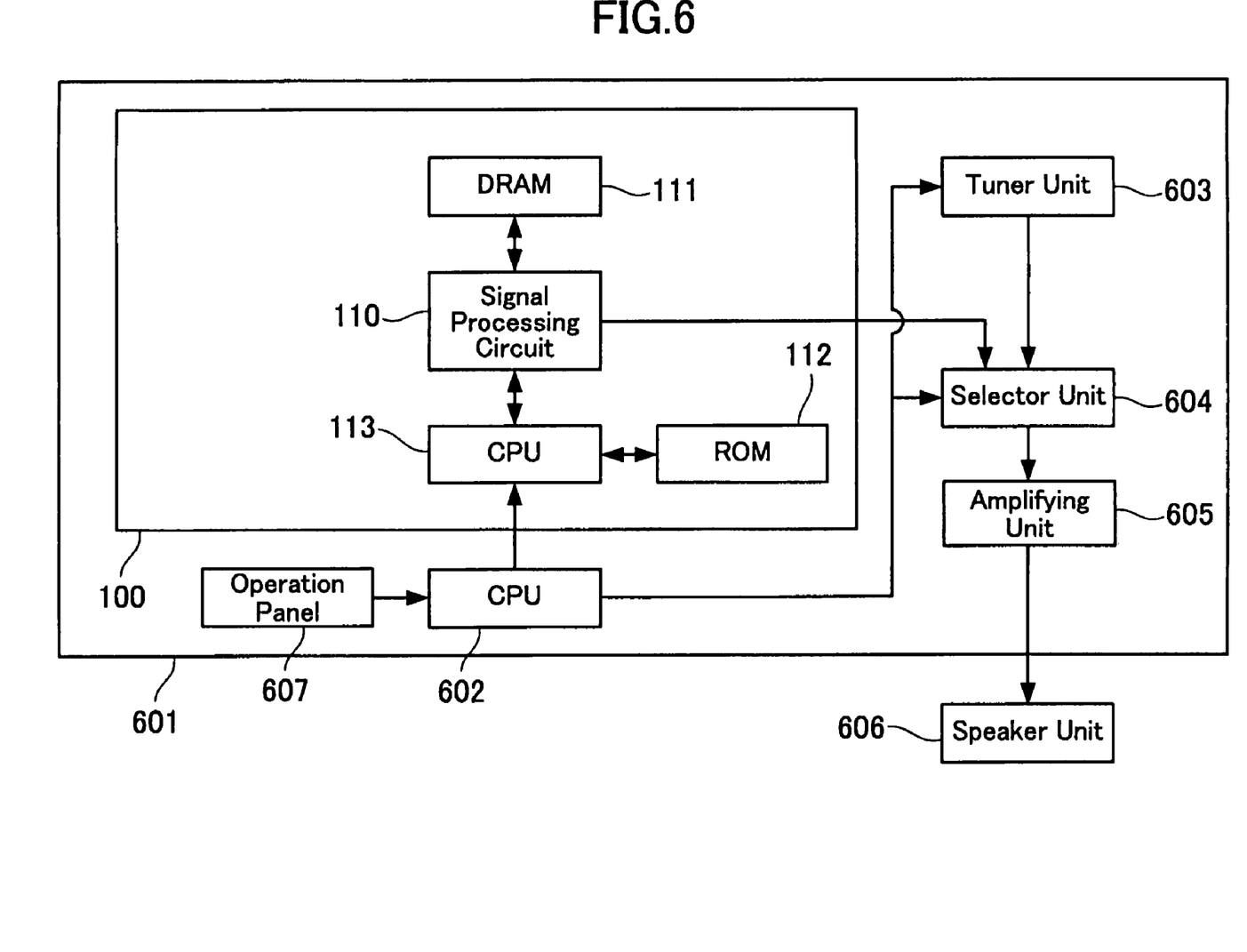
FIG. 6 is a block diagram for showing constituent elements forming part of a fourth embodiment of the optical disc apparatus according to the present invention.

FIG. 6 is a block diagram showing a construction of constituent elements forming part of a fourth embodiment of the optical disc apparatus according to the present invention. The present embodiment of the optical disc apparatus according to the present invention is mounted on an automotive vehicle and operatively connected to an in-vehicle audio equipment 601 operative to selectively assume a plurality of operation modes including an optical disc operation mode having the optical disc reproduced. The present embodiment of the optical disc apparatus is adapted to resume reproduction of information recorded on the optical disc when the in-vehicle audio equipment 601 switches to the optical disc operation mode from an operation mode other than the optical disc operation mode. As shown in FIG. 6, the in-vehicle audio equipment 601 comprises a CPU 602, a tuner unit 603 shown as an example of an audio device, a selector unit 604, an amplifying unit 605, a speaker unit 606, and an operation panel 607 in addition to the first embodiment of the optical disc apparatus 100. It is herein assumed that the in-vehicle audio equipment 601 is operative to selectively assume a plurality of operation modes including an optical disc operation mode having the optical disc apparatus 100 reproduce information recorded on the optical disc, and a tuner operation mode having the tuner unit 603 reproduce information.

The operation panel 607 is designed to have an operator select an operation mode. The CPU 602 is adapted to produce an operation mode signal indicative of the operation mode to be outputted to the CPU 113 forming part of the optical disc apparatus 100, the tuner unit 603, and the selector unit 604. The CPU 113 forming part of the optical disc apparatus 100 is operative to have the reproduction of the optical disc started in response to the operation mode signal indicative of the optical disc operation mode, hereinlater simply referred to as an "optical disc operation mode signal". The CPU 113 forming part of the optical disc apparatus 100, on the other hand, is operative to have the reproduction of the optical disc stopped in response to the operation mode signal indicative of the tuner operation mode, hereinlater simply referred to as a "tuner operation mode signal".

The selector unit 604 is operative to have the optical disc apparatus 100 supply an output signal to the amplifying unit 605 in response to the optical disc operation mode signal. The amplifying unit 605 is operative to amplify the output signal from the selector unit 604. The speaker unit 606 is operative to convert the output signal thus amplified into a sound. The selector unit 604, on the other hand, is operative to have the tuner unit 603 supply an output signal to the amplifying unit 605 in response to the tuner operation mode signal. The amplifying unit 605 is operative to amplify the output signal from the selector unit 604.

Figure 7:
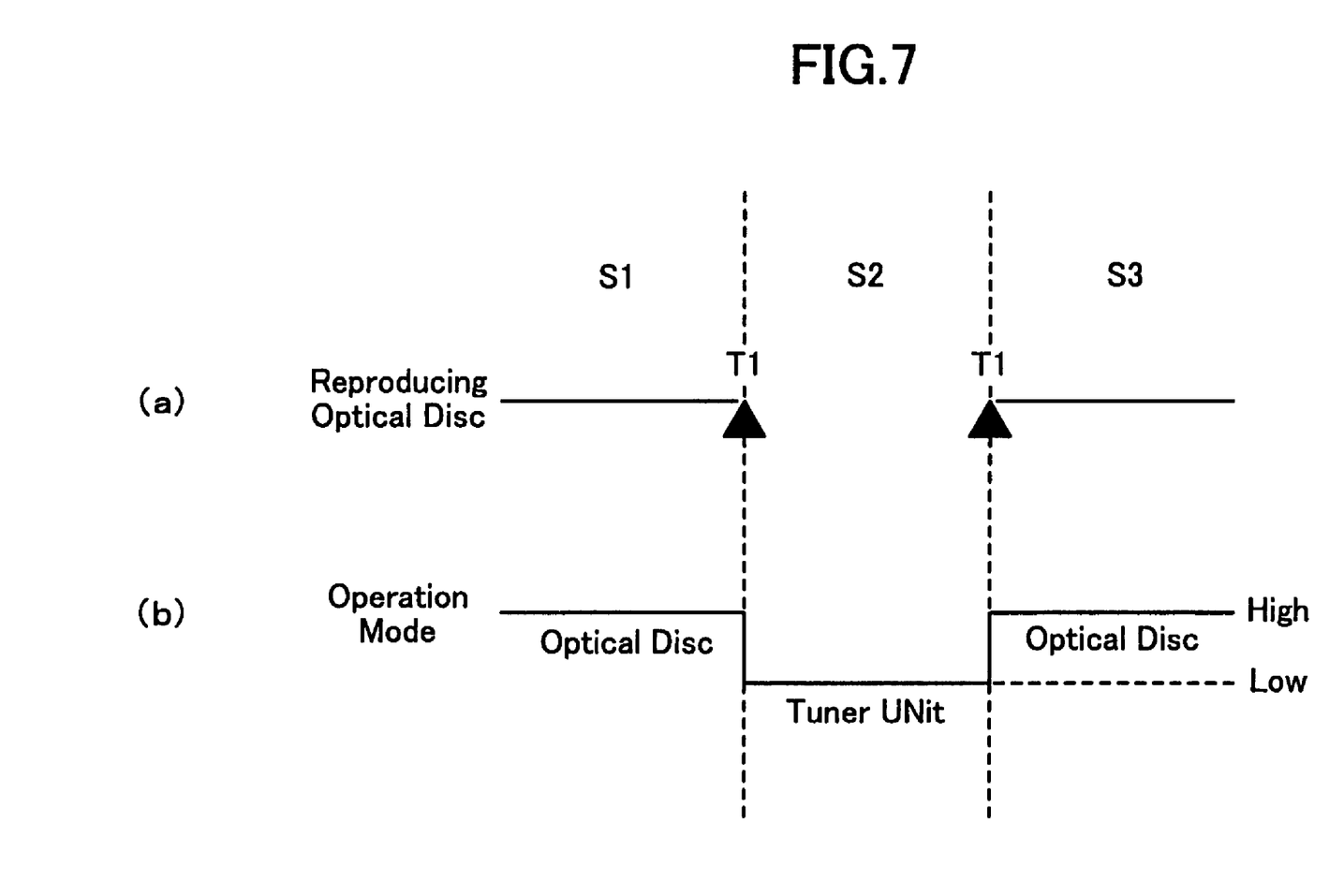
FIG. 7 is a timing chart for explaining an operation of the optical disc apparatus shown in FIG. 6.

As shown in FIG. 7, the operation mode signal remains at a high level in states S1 and S3, in which the operation mode signal is indicative of the optical disc operation mode, while, on the other hand, the operation mode signal remains at a low level in a state S2, in which the operation mode signal is indicative of the tuner operation mode. Information recorded on the optical disc is reproduced until a time point when the reproduction time is T1. At the time point when the reproduction time is T1, the operation mode signal changes from the high level to the low level. This means that the optical disc apparatus changes from the state S1 to a state S2 and the reproduction operation of the optical disc was stopped at the time point when the reproduction time is T1. When the operation mode signal changes from the low level to the high level (when the state S2 changes to the state S3), the reproduction of the optical disc is resumed from the reproduction time T1. In general, power supply to the tuner unit 603 is turned off in the optical disc operation mode. On the other hand, power is uninterruptedly supplied to the CPU 113, the ROM 112, and the DRAM 111 while power supply to power consuming circuits such as, for example, driving circuits are turned off in the tuner operation mode as described in the above to have the optical disc stop rotating and the actuator stop operating.

As will be seen from the foregoing description, it is to be understood that the present embodiment of the optical disc apparatus is mounted on an automotive vehicle and operative to reproduce and stop reproducing information recorded on the optical disc in response to the operation mode selected by way of the operation panel, and calculate reproduction time information before resuming reproduction of the information recorded on the optical disc. This leads to the fact that the present embodiment of the optical disc apparatus can obtain the reproduction time information after the operation mode is changed and resume reproduction of the optical disc from the reproduction position immediately prior to the time point when the optical disc operation mode changed to the tuner operation mode in the event that the optical disc operation mode changed to the tuner operation mode and then the tuner operation mode changed to the optical disc operation mode even in the case that the present embodiment of the optical disc apparatus is operative to reproduce compression audio signal recorded on the optical disc having no reproduction time information in its address information.

INDUSTRIAL APPLICABILITY OF THE PRESENT INVENTION

In view of the foregoing description, it is to be understood that the optical disc apparatus according to the present invention can attain an effect of obtaining the reproduction time information after the power supply is restored in the event that power supply is turned off while reproducing compression audio signal recorded on the optical disc having no reproduction time information in its address information, and is available for the optical disc apparatus and the like for resuming the reproduction of compression audio signal recorded on the optical disc based on the obtained reproduction time information.

What is claimed is:

1. An optical disc apparatus, comprising:
   an optical unit for projecting a laser light to an optical disc having a plurality of addresses and converting a reflection light reflected from said optical disc into an electrical signal, said electrical signal including a plurality of bits;
   signal processing means for processing said electrical signal at a predetermined bit-rate from said optical unit to have said electrical signal converted into reproduction information required for reproduction;
   parameter storage means for storing therein a plurality of parameters contained in said reproduction information from said signal processing means, said parameters including the bit-rate and a number of addresses from the plurality of addresses processed by the signal processing means;
   reproduction time computing means for computing a reproduction time based on said plurality of parameters stored in said parameter storage means, wherein the reproduction time is a point in time; and
   optical disc reproduction means for determining a reproduction start position based on said plurality of parameters stored in said parameter storage means.

2. An optical disc apparatus as set forth in claim 1, which further comprises:
   reproduction time displaying means for displaying said reproduction time based on information on said reproduction time computed by said reproduction time computing means.

3. An optical disc apparatus as set forth in claim 1, which is mounted on an automotive vehicle, and in which
   said reproduction time computing means is operative to read out said parameter stored in said parameter storage means to calculate a reproduction time at the time point when an accessory power supply was turned off and said optical disc reproduction means is operative to determine a reproduction start position substantially at the time point when said accessory power supply was turned off, in the event that said accessory power supply was turned off while reproducing said optical disc and then turned on.

4. An optical disc apparatus as set forth in claim 1, operatively connected to an audio equipment operative to selectively assume a plurality of operation modes including an optical disc operation mode having said optical disc reproduced, and in which
   said reproduction time computing means is operative to read out said parameter stored in said parameter storage means to calculate a reproduction time at the time point when said audio equipment switches to an operation mode other than said optical disc operation mode from said optical disc operation mode and said optical disc reproduction means is operative to determine a reproduction start position substantially at the time point when said audio equipment switches an operation mode other than said optical disc operation mode from said optical disc operation mode, in the event that said audio equipment switches to an operation mode other than said optical disc operation mode from said optical disc operation mode while reproducing said optical disc and then switches to said optical disc operation mode.

* * * * *

UNITED STATES PATENT AND TRADEMARK OFFICE
CERTIFICATE OF CORRECTION

| | | |
|---|---|---|
| PATENT NO. | : 7,382,703 B2 | Page 1 of 1 |
| APPLICATION NO. | : 10/538182 | |
| DATED | : June 3, 2008 | |
| INVENTOR(S) | : Hiromi Nakase et al. | |

It is certified that error appears in the above-identified patent and that said Letters Patent is hereby corrected as shown below:

On the title page item (54) and col. 1, line 1, "OPTICAL DISC APPARATUS" should read -- OPTICAL DISC APPARATUS FOR CALCULATING A REPRODUCTION TIME AND A REPRODUCTION POSITION --

Signed and Sealed this

Fifth Day of May, 2009

JOHN DOLL
*Acting Director of the United States Patent and Trademark Office*